(12) United States Patent
Yoshida et al.

(10) Patent No.: US 10,978,984 B2
(45) Date of Patent: Apr. 13, 2021

(54) ELECTRIC VEHICLE

(71) Applicant: SUBARU CORPORATION, Tokyo (JP)

(72) Inventors: Shogo Yoshida, Tokyo (JP); Naohiro Imamura, Tokyo (JP); Misako Kuwahara, Tokyo (JP); Takahito Fujino, Tokyo (JP); Takahiro Akaba, Tokyo (JP); Suguru Inoue, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/507,503

(22) Filed: Jul. 10, 2019

(65) Prior Publication Data

US 2020/0091853 A1    Mar. 19, 2020

(30) Foreign Application Priority Data

Sep. 19, 2018  (JP) .............................. JP2018-174353

(51) Int. Cl.
*H02P 27/08* (2006.01)
*B60L 50/51* (2019.01)
(Continued)

(52) U.S. Cl.
CPC .............. *H02P 27/08* (2013.01); *B60L 3/003* (2013.01); *B60L 50/51* (2019.02); *H02P 5/74* (2013.01);
(Continued)

(58) Field of Classification Search
CPC ...... B60L 2210/40; B60L 50/51; B60L 3/003; B60L 50/15; H02P 27/06; H02P 27/08; H02P 5/74; H02P 29/024
See application file for complete search history.

(56) References Cited

U.S. PATENT DOCUMENTS 5,376,868 A * 12/1994 Toyoda ................... B60L 15/20
                                                318/587
5,481,460 A *  1/1996 Masaki .................... B60L 3/00
                                                701/50
(Continued)

FOREIGN PATENT DOCUMENTS

JP    2002-233003 A    8/2002
JP    2006-129662 A    5/2006
(Continued)

OTHER PUBLICATIONS

Japanese Office Action issued in corresponding Japanese Patent Application No. 2018-174353 dated May 19, 2020, with machine translation.

*Primary Examiner* — Thai T Dinh
(74) *Attorney, Agent, or Firm* — Troutman Pepper Hamilton Sanders LLP

(57) ABSTRACT

An electric vehicle includes drive systems, a control apparatus that controls the drive systems, and wheels. Each drive system includes a motor and an inverter coupled by wires. The wires of the drive systems are coupled by first bypass lines. Each inverter converts direct current power supplied from a corresponding power supply into alternating current power and supplies the alternating current power to the corresponding motor. Each motor drives the corresponding wheel. When an abnormality occurs in the supply of the alternating current power from the inverter to the motor in one drive system, the control apparatus performs control (i) to stop the supply of the alternating current power from the inverter of the one drive systems, and (ii) to supply the alternating current power supplied from the inverter to the motor in another drive system, to the motor of the one drive system via the first bypass lines.

9 Claims, 9 Drawing Sheets

(51) Int. Cl.
*H02P 5/74* (2006.01)
*H02P 29/024* (2016.01)
*B60L 3/00* (2019.01)

(52) U.S. Cl.
CPC .......... *H02P 29/024* (2013.01); *B60L 2240/12* (2013.01); *B60L 2240/24* (2013.01); *B60L 2240/526* (2013.01); *B60Y 2200/10* (2013.01)

(56) References Cited

U.S. PATENT DOCUMENTS

| | | | |
|---|---|---|---|
| 7,173,386 B1* | 2/2007 | Jeon | B60L 3/0023 318/53 |
| 7,200,482 B2* | 4/2007 | Kawarasaki | B60L 3/04 701/97 |
| 7,733,202 B2* | 6/2010 | Feil | H01H 51/06 335/179 |
| 9,126,599 B2* | 9/2015 | Ozaki | B60W 10/08 |
| 9,452,681 B2* | 9/2016 | Mihara | B60L 3/003 |
| 2009/0251831 A1* | 10/2009 | Shiba | H02P 27/06 361/30 |
| 2010/0025131 A1* | 2/2010 | Gloceri | B60G 3/20 180/65.28 |
| 2010/0194318 A1* | 8/2010 | Aso | B60L 15/2045 318/400.3 |
| 2013/0035203 A1* | 2/2013 | Arakawa | B60W 10/02 477/5 |
| 2017/0302216 A1 | 10/2017 | Ide | |
| 2019/0152330 A1* | 5/2019 | Lee | B60L 3/0046 |

FOREIGN PATENT DOCUMENTS

| | | |
|---|---|---|
| JP | 2010-200426 A | 9/2010 |
| JP | 2017-22896 A | 1/2017 |
| JP | 2017-192254 A | 10/2017 |

\* cited by examiner

US 10,978,984 B2

ELECTRIC VEHICLE

CROSS-REFERENCE TO RELATED APPLICATIONS

The present application claims priority from Japanese Patent Application No. 2018-174353 filed on Sep. 19, 2018, the entire contents of which are hereby incorporated by reference.

BACKGROUND

The disclosure relates to an electric vehicle.

For example, there is an electric vehicle configured to convert direct current (DC) power supplied from a power supply into alternating current (AC) power by an inverter, to supply the AC power to a motor, and to travel by driving wheels with the motor.

In the disclosure, the term "electric vehicle" refers to a vehicle capable of traveling by driving wheels with a motor. Examples of the electric vehicle include (i) an electric vehicle, in a narrow sense, using a battery as a power supply, (ii) a so-called fuel cell vehicle using a fuel cell as a power supply, and (iii) a so-called hybrid vehicle including a prime mover such as an engine, in addition to a motor.

In such an electric vehicle, when an abnormality occurs in supply of the AC power from the inverter to the motor due to a malfunction of the power supply or the inverter, the electric vehicle may behave abnormally, for example, the wheels do not rotate or abnormal torque is generated by rotation of the wheels.

To address the above matters, a Japanese Unexamined Patent Application Publication No. 2017-192254 discloses a technique that, when an abnormality occurs in supply of AC power from an inverter to a motor in an electric vehicle, appropriately stops the electric vehicle by simultaneously turning off all the inverters and stopping rotation of all wheels at the same time.

SUMMARY

An aspect of the disclosure provides an electric vehicle including a plurality of drive systems, a control apparatus configured to control the drive systems, and wheels. Each drive system includes a motor and an inverter. The motor and the inverter are coupled to each other by wires. The wires of the plurality of drive systems are coupled to each other by first bypass lines. Each inverter is configured to convert direct current power supplied from a corresponding power supply into alternating current power and supply the alternating current power to the corresponding motor. Each motor is configured to drive the corresponding wheel. When an abnormality occurs in the supply of the alternating current power from the inverter to the motor in one of the drive systems, the control apparatus performs control to stop the supply of the alternating current power from the inverter of the one of the drive systems, and to supply the alternating current power, which is supplied from the inverter to the motor in another one of the drive systems, to the motor of the one of the drive systems via the first bypass lines.

An aspect of the disclosure provides an electric vehicle including a plurality of drive systems, a control apparatus configured to control the drive systems, and wheels. Each drive system includes a motor and an inverter. The motor and the inverter are coupled to each other by power lines. The power lines of the plurality of drive systems are coupled to each other by bypass lines. Each inverter is configured to convert direct current power supplied from a corresponding power supply into alternating current power and supply the alternating current power to the corresponding motor. Each motor is configured to drive the corresponding wheel. When an abnormality occurs in the supply of the direct current power from the power source to the inverter in one of the drive systems, the control apparatus performs control to stop the supply of the direct current power from the power source of the one of the drive systems, and to supply the direct current power, which is supplied from the power supply to the inverter in another one of the drive systems, to the inverter of the one of the drive systems via the bypass lines.

An aspect of the disclosure provides an electric vehicle including a plurality of drive systems, circuitry configured to control the drive systems, and wheels. Each drive system includes a motor and an inverter. The motor and the inverter are coupled to each other by wires. The wires of the plurality of drive systems are coupled to each other by first bypass lines. Each inverter is configured to convert direct current power supplied from a corresponding power supply into alternating current power and supply the alternating current power to the corresponding motor. Each motor is configured to drive the corresponding wheel. When an abnormality occurs in the supply of the alternating current power from the inverter to the motor in one of the drive systems, the circuitry performs control to stop the supply of the alternating current power from the inverter of the one of the drive systems, and to supply the alternating current power, which is supplied from the inverter to the motor in another one of the drive systems, to the motor of the one of the drive systems via the first bypass lines.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
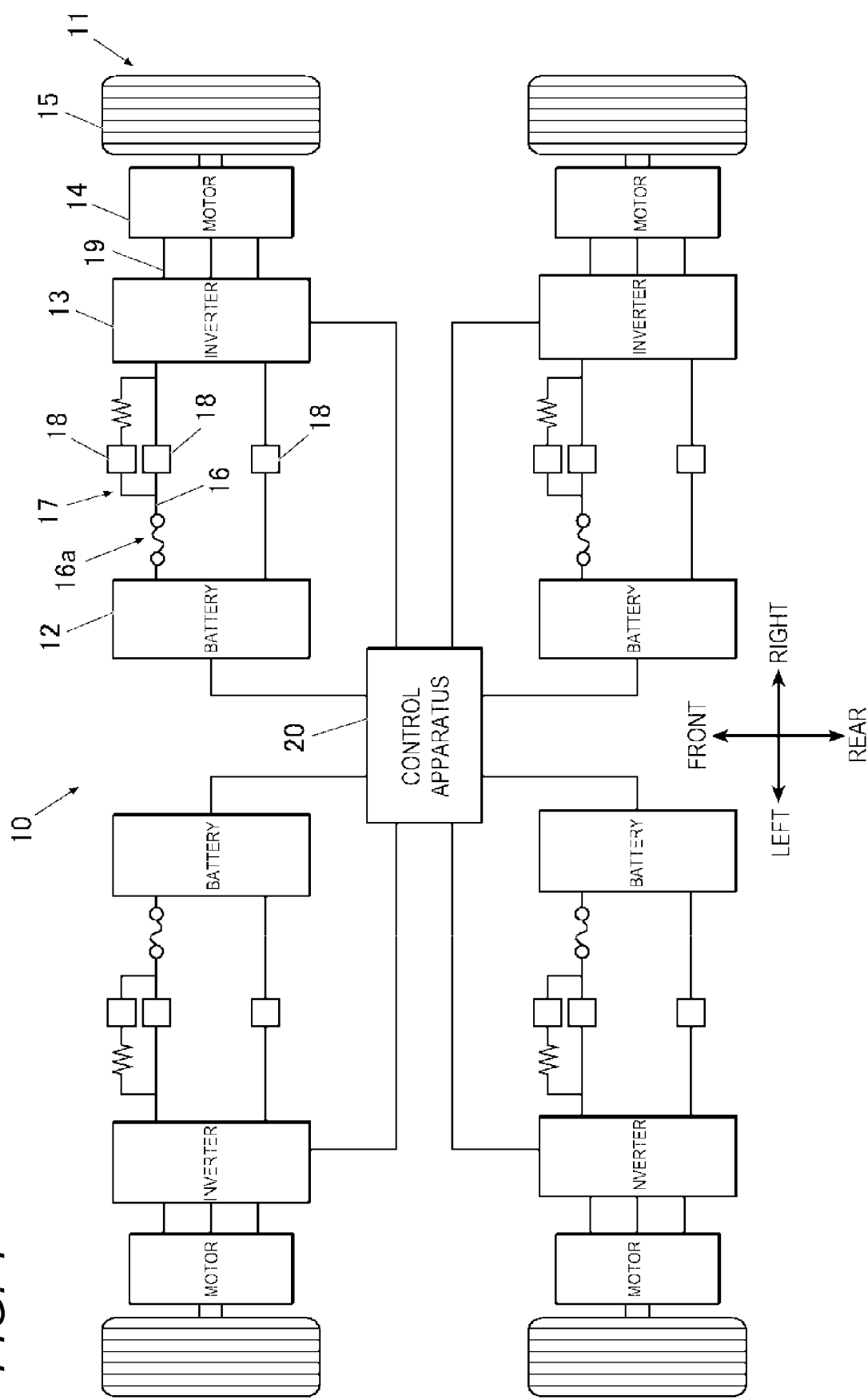
FIG. 1 illustrates an example of the configuration of an electric vehicle.

In the following, some embodiments of the disclosure are described in detail with reference to the accompanying drawings. Note that sizes, materials, specific values, and any other factors illustrated in respective embodiments are illustrative for easier understanding of the disclosure, and are not intended to limit the scope of the disclosure unless otherwise specifically stated. Further, elements in the following example embodiments which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

If an electric vehicle is stopped when an abnormality occurs in supply of AC power from an inverter to a motor in the electric vehicle, the electric vehicle stops on a travel path of a road and might obstruct following vehicles or be collided by the following vehicles.

Therefore, if the electric vehicle is not disabled in the above case and, for example, can be pulled over to a side of a road, such a problem is prevented. It is more desirable that the electric vehicle can be travelled and transported to a repair plant.

In view of the above, it is desirable to provide an electric vehicle that avoids disablement even when an abnormality occurs in supply of AC power from an inverter to a motor.

In the following embodiments, the following case will be described, that is, the electric vehicle is an electric vehicle in a narrow sense that uses a battery as a power supply and that does not include another prime mover such as an engine. It should be noted that as described above, embodiments of the disclosure are applicable to any electric vehicle if the electric vehicle travels by driving wheels with a motor. Some embodiments of the disclosure is applicable to a case where the electric vehicle is a so-called fuel cell vehicle or a hybrid vehicle.

In the embodiments, as illustrated in FIG. 1, an electric vehicle 10 includes batteries 12, inverters 13, motors 14, wheels 15, and a control apparatus 20.

In the embodiments, descriptions will be given on a case where a motor 14 like a so-called in-wheel motor is provided for each wheel 15 as illustrated in FIG. 1. Alternatively, the motors 14 may be provided only for the front wheels (so-called front wheel drive vehicle (FF vehicle)) or only for the rear wheels (so-called rear wheel drive vehicle (FR vehicle). Further alternatively, a motor 14 may be provided for the front wheels and another motor 14 may be provided for the rear wheels.

In the embodiments, the battery 12 serves as a power supply. The battery 12 supplies DC power of a predetermined power value to the inverter 13 via a power line 16 under control of the control apparatus 20.

A component such as a fuse 16a is appropriately attached to the power line 16. FIG. 1 illustrates a case where a pre-charge circuit 17 is disposed on each power lines 16.

Electromagnetic switches 18 are attached to the power line 16 and the pre-charge circuit 17, respectively. The electromagnetic switches 18 render the power line 16 and the like conductive or nonconductive. The electromagnetic switches 18 are also referred to as contactors. The power line 16 is conductive when the electromagnetic switches 18 are closed, and is nonconductive when opened. Although not illustrated in FIG. 1, each electromagnetic switch 18 is electrically coupled to the control apparatus 20. The control apparatus 20 control each electromagnetic switch to open or close.

The inverter 13 converts DC power supplied from the battery 12 into AC power under the control of the control apparatus 20. The inverter 13 and the motor 14 are coupled to each other by wires 19 such as three-phase lines. The inverter 13 supplies the AC power to the motor 14 via the wires 19.

The inverter 13 and the motor 14 are coupled to each other by the wires 19, to form one drive system 11.

In the embodiments, the description will be given on a case where, as illustrated in FIG. 1, one battery 12 (an example of a power supply) is provided for each of the front-right, rear-right, front-left, and rear-left drive systems 11, and the battery 12 and the inverter 13 are coupled to each other by the power line 16 in each drive system 11. Alternatively, the battery 12 (an example of the power supply) may supply power to a plurality of inverters 13.

FIG. 1 illustrates the case where the battery 12 and the inverter 13 are coupled to each other by two power lines 16, and the inverter 13 and the motor 14 are coupled to each other by three wires 19. It should be noted that the number of power lines 16 is not limited to two and that the number of wires 19 is not limited to three.

In the embodiments, the control apparatus 20 is configured with an electronic control unit (ECU). The control apparatus 20 controls, as described above, the power value of the DC power supplied to the inverter 13 by controlling the battery 12.

The control apparatus 20 controls the inverter 13 by, for example, transmitting a pulse width modulation (PWM) signal to the inverter 13, and changes a rotation speed of the motor 14 (that is, a rotation speed of the wheel 15) by changing frequency of an AC current supplied to the motor 14.

In this way, in the embodiments, the control apparatus 20 controls the drive system 11 including the battery 12 and the inverter 13.

In the embodiments, the control apparatus 20 also controls each power line 16 to be conductive or nonconductive by further controlling each electromagnetic switch 18 of each power line 16 to close or open, as described above.

Although not illustrated in FIG. 1, the control apparatus 20 is also electrically coupled to apparatuses such as the motors 14 and various sensors. The control apparatus 20 is configured to acquire information necessary for control from the apparatuses and the various sensors, receive feedback therefrom, or transmit control signals thereto.

In the embodiments, the description will be given on a case where the control apparatus 20 collectively controls the drive systems 11 each including the battery 12 and the inverter 13 as illustrated in FIG. 1. Alternatively, the electric vehicle 10 may include, for example, a battery controller that controls the batteries 12 and a motor system controller that controls the inverters 13, separately. In this case, the battery controller and the motor system controller work in cooperation with each other to perform the control according to the embodiments.

Hereinafter, description will be given on a configuration of the electric vehicle 10 according to the embodiments, for preventing the electric vehicle 10 from being disabled even when an abnormality occurs in the supply of the AC power from the inverter 13 to the motor 14.

A few embodiments of the configuration will be described in detail below.

First Embodiment

Figure 2:
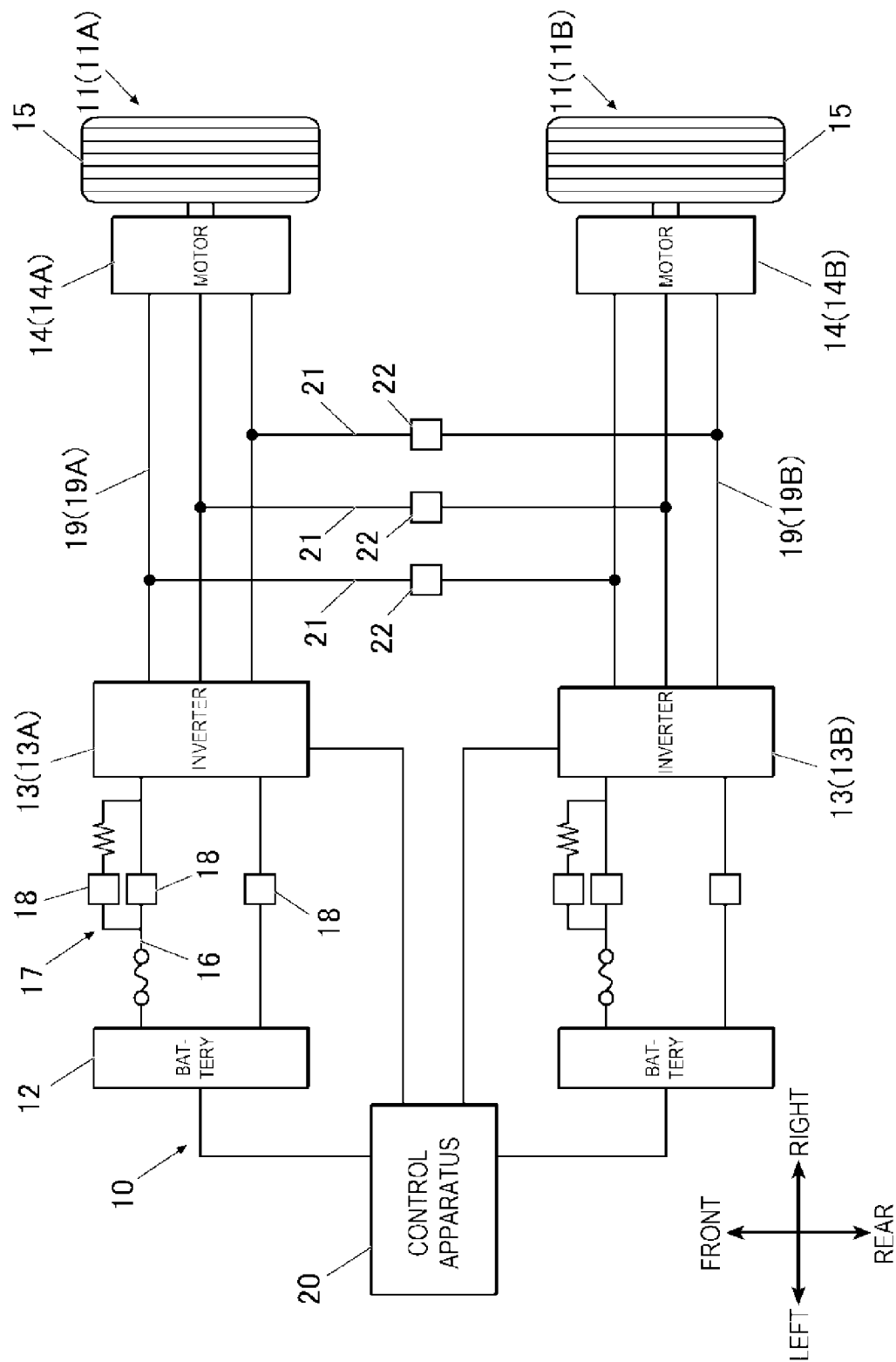
FIG. 2 illustrates the configuration of the electric vehicle according to a first embodiment.

FIG. 2 illustrates the configuration of the electric vehicle according to a first embodiment of the disclosure. The configuration of a left portion of the electric vehicle 10 is the same as that of a right portion of the electric vehicle 10, and a description thereof will be omitted.

In the embodiment, the wires 19 of the plurality of drive systems 11 are coupled to each other by first bypass lines 21. For example, when the inverter 13 and the motor 14 in each drive system 11 are coupled to each other by a three-phase line, each of three wires 19A of a front drive system 11A and a corresponding wire 19B of a rear drive system 11B are coupled to each other by the corresponding first bypass line 21 as illustrated in FIG. 2, so that the wires 19 of the plurality of drive systems 11 are coupled to each other by the first bypass lines 21.

When an abnormality occurs in the supply of the AC power from the inverter 13 to the motor 14 in one drive system 11, the control apparatus 20 performs control to stop the supply of the AC power from the inverter 13 to the motor 14, and to also supply the AC power, which is supplied from the inverter 13 to the motor 14 in the other drive system 11, to the motor 14 in the one drive system 11 via the first bypass lines 21.

This will be described in detail below.

Figure 3:
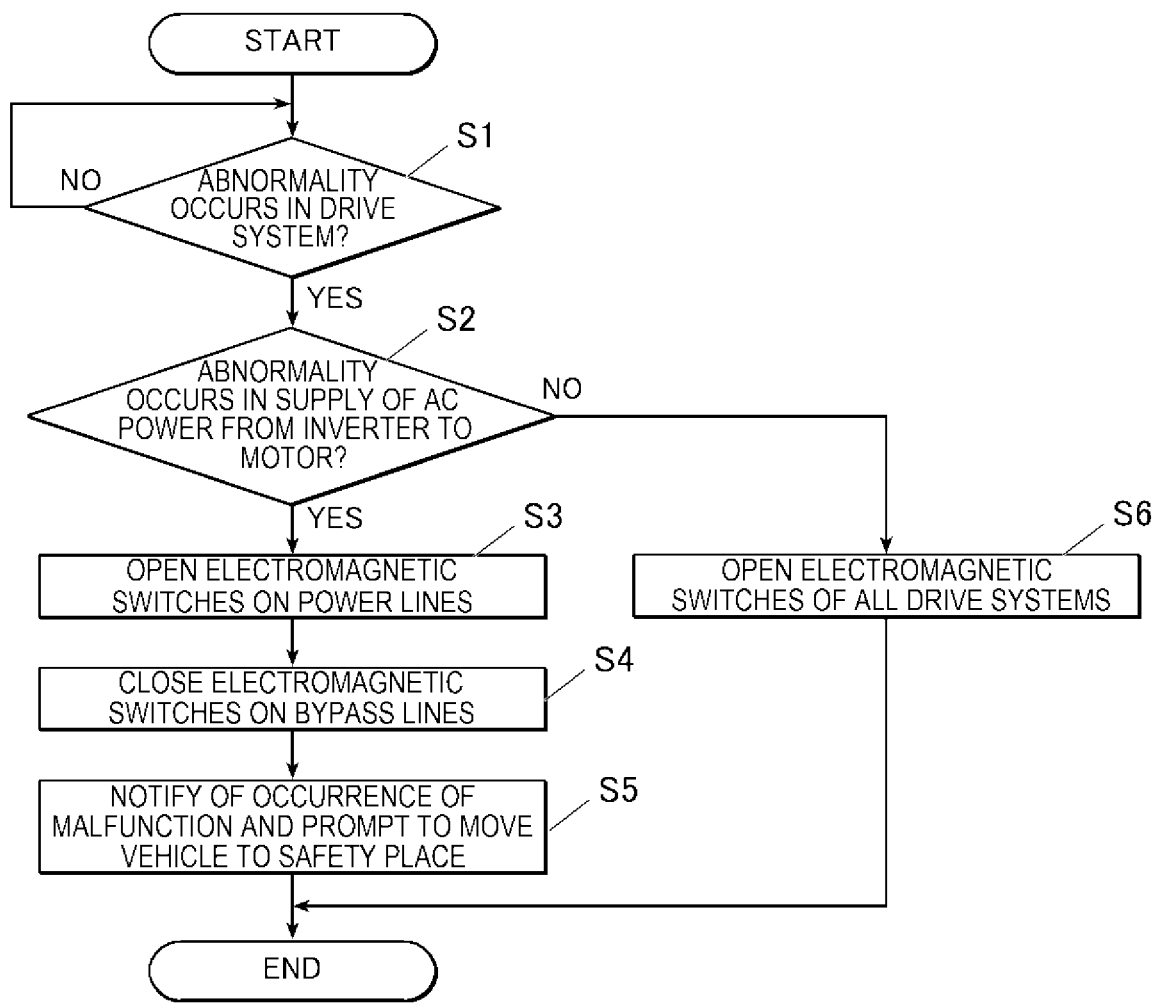
FIG. 3 is a flowchart illustrating a control method by a control apparatus according to the first embodiment.

A control method by the control apparatus 20 will also be described based on a flowchart illustrated in FIG. 3.

As illustrated in FIG. 2, electromagnetic switches 22 are attached to the first bypass lines 21, respectively.

The control apparatus 20 always monitors whether an abnormality has occurred in each drive system 11 by monitoring, for example, a power value of the DC power supplied from the battery 12, a power value of the AC power supplied from the inverter 13, a rotation speed of the motor 14 and a rotation speed of the wheel 15 (step S1 in FIG. 3).

For example, consider a case where an abnormality occurs in the drive system 11A on the front right side. When the abnormality occurs in the drive system 11A on the front right side even though no abnormality occurs in the supply of the AC power from the inverter 13A to the motor 14A in the drive system 11A, the abnormality may occur in the motor 14A itself. When the vehicle continues traveling, an occupant may be put in danger.

Therefore, when the control apparatus 20 determines that the abnormality has occurred in a certain drive system 11 (step S1: YES), the process proceeds to step S2. Hereinafter, description will be given on the case where the abnormality occurs in the drive system 11A on the front right side. When no abnormality occurs in the supply of the AC power from the inverter 13A to the motor 14A in the drive system 11A and the supply of the AC power is normal (step S2: NO), the respective electromagnetic switches 18 provided on the power lines 16 and pre-charge circuits 17 of all the drive systems 11 in the electric vehicle 10 are opened (step S6), to stop the vehicle.

On the other hand, when the abnormality occurs in the supply of the AC power from the inverter 13A to the motor 14A in the drive system 11A on the front right side (step S2: YES), the control apparatus 20 opens the electromagnetic switches 18 provided on the power line 16 and pre-charge circuit 17 that are coupled to the inverter 13A (step S3), to stop supply of the DC power from the battery 12 to the inverter 13A.

When the abnormality occurs in the supply of the AC power to the motor 14A, the control apparatus 20 stops the supply of the AC power from the inverter 13A to the motor 14A in the manner described above. Therefore, no AC power is supplied from the inverter 13A to the motor 14A.

At the same time, the control apparatus 20 performs control to render the first bypass lines 21 conductive by closing the electromagnetic switches 22 of the first bypass lines 21 that respectively couple the wires 19A of the drive system 11A on the front right side and the wires 19B of the drive system 11B on the rear right side to each other (step S4). As a result, the AC power, which is supplied from an inverter 13B to a motor 14B in the drive system 11B on the rear right side, is also supplied to the motor 14A of the drive system 11A on the front right side via the first bypass lines 21.

Figure 4:
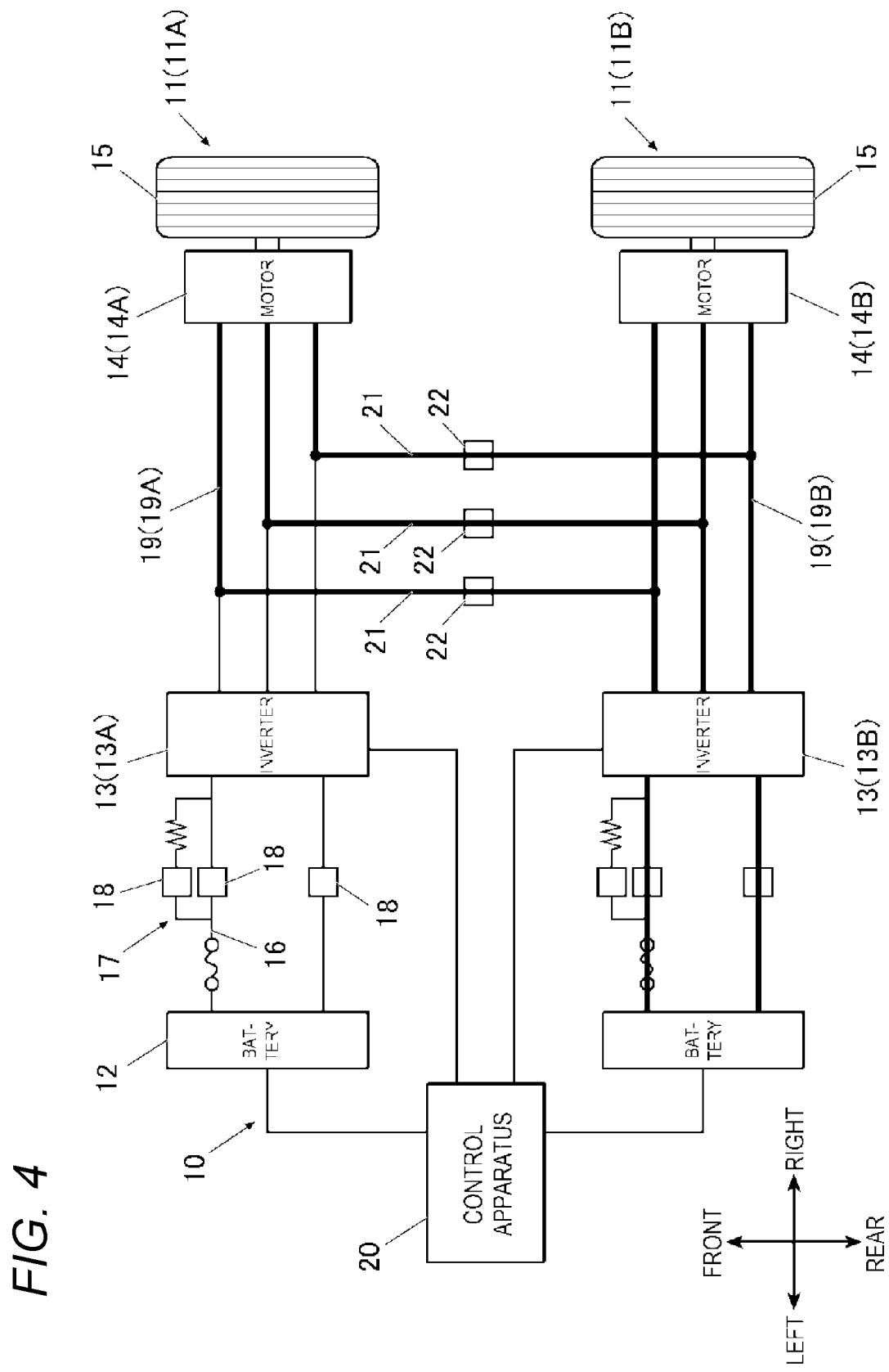
FIG. 4 illustrates a flow of DC power and AC current according to the first embodiment.

In this case, as illustrated in FIG. 4, the AC power is supplied from the inverter 13B in the drive system 11B on the rear right side to both the motor 14B on the rear right side and the motor 14A on the front right side. In FIG. 4, a flow of DC power and AC current in the embodiment is indicated by thick lines.

As described above, in the embodiment, even when the abnormality occurs in the supply of the AC power from the inverter 13 to the motor 14, the AC power is supplied from the inverter 13 (the inverter 13B in the above case) that supplies the normal AC power, (i) to the original supply target motor 14 (motor 14B) and (ii) via the first bypass lines 21 to the motor 14 (the motor 14A) coupled to the other inverter 13 (the inverter 13A) that stops the supply of the AC power due to the occurrence of the abnormality in AC power supply.

Therefore, even if the abnormality occurs in the supply of the AC power from a certain inverter 13 and the supply of the AC power from the inverter 13 to the motor 14 is stopped, the AC power is appropriately supplied to the motor 14 from the other inverter 13 that outputs the normal AC power, and rotary drive of the motor 14 is continued. Therefore, it is possible to properly prevent the electric vehicle 10 from being disabled. A driver can pull the vehicle over to a side of a road to stop the vehicle or drive (transport) the vehicle to a repair plant.

At this time, when the electric vehicle 10 (see FIG. 1) having the drive systems 11 for the front-right, rear-right, front-left, and rear-left wheels 15 like the so-called in-wheel motors travels a right-hand or left-hand curve or turn right or left, a relative large difference may occur between the rotation speeds of the left and right wheels 15. However, a large difference does not occur between the rotation speeds of the front and rear wheels 15.

For this reason, when the wires 19A of the front drive system 11A and the wires 19B of the rear drive system 11B are respectively coupled to each other by the first bypass lines 21 on each of a right side and a left side of the vehicle as illustrated in FIG. 2, as described above, even if switching is made so that the AC power is supplied from the inverter 13B of the other drive system 11B to the motor 14A of the one drive system 11A as described above, the rotation speed of the motor 14A is not significantly changed. Therefore, the above-described switching operations is performed without causing a driver to feel a sense of discomfort.

However, in the embodiment, even if travel of the electric vehicle 10 is continued without the electric vehicle 10 being disabled as described above, the supply of the AC power from the inverter 13A to the motor 14A is still abnormal. Therefore, it is desirable to prompt the driver to take appropriate measures such as stopping the vehicle.

For this reason, in the embodiment, the control apparatus 20 notifies the driver or the like of the occurrence of the malfunction and prompts the driver or the like to move the vehicle to a safety place (step S5) by displaying information on a monitor disposed on an instrument panel or turning on or blinking a warning lamp although not illustrated.

When the abnormality that occurs in the drive system 11 is not removed even though the above described control is performed, that is, when the abnormality in the rotation speed of the motor 14 or the like is not improved, continuing the travel of the vehicle might put an occupant in danger.

Therefore, in such a case, the control apparatus 20 performs appropriate controls such as stopping the vehicle by opening the respective electromagnetic switches 18 disposed on the power lines 16 and pre-charge circuits 17 of all the drive systems 11 in the electric vehicle 10.

Second Embodiment

In the first embodiment described above, when an abnormality occurs in supply of AC power from the inverter 13 to the motor 14, the control apparatus 20 does not specify a site where the abnormality actually occurs.

However, for example, when the site at which the abnormality occurs is in the battery 12, that is, the battery 12 cannot supply normal DC power due to malfunction of the battery 12 or battery exhaustion, and when the inverter 13 functions normally, it is desirable to supply the AC power from the inverter 13, that functions normally, of the drive system 11 to which the motor 14 belongs, rather than to supply the AC power from the inverter 13 of another drive system 11 to the motor 14 as in the first embodiment.

Therefore, in the second embodiment, description will be given on the electric vehicle 10 in which even when the abnormality occurs in the supply of the AC power from the inverter 13 to the motor 14, if the inverter 13 functions normally, the AC power can be supplied from the inverter 13 to the motor 14.

Figure 5:
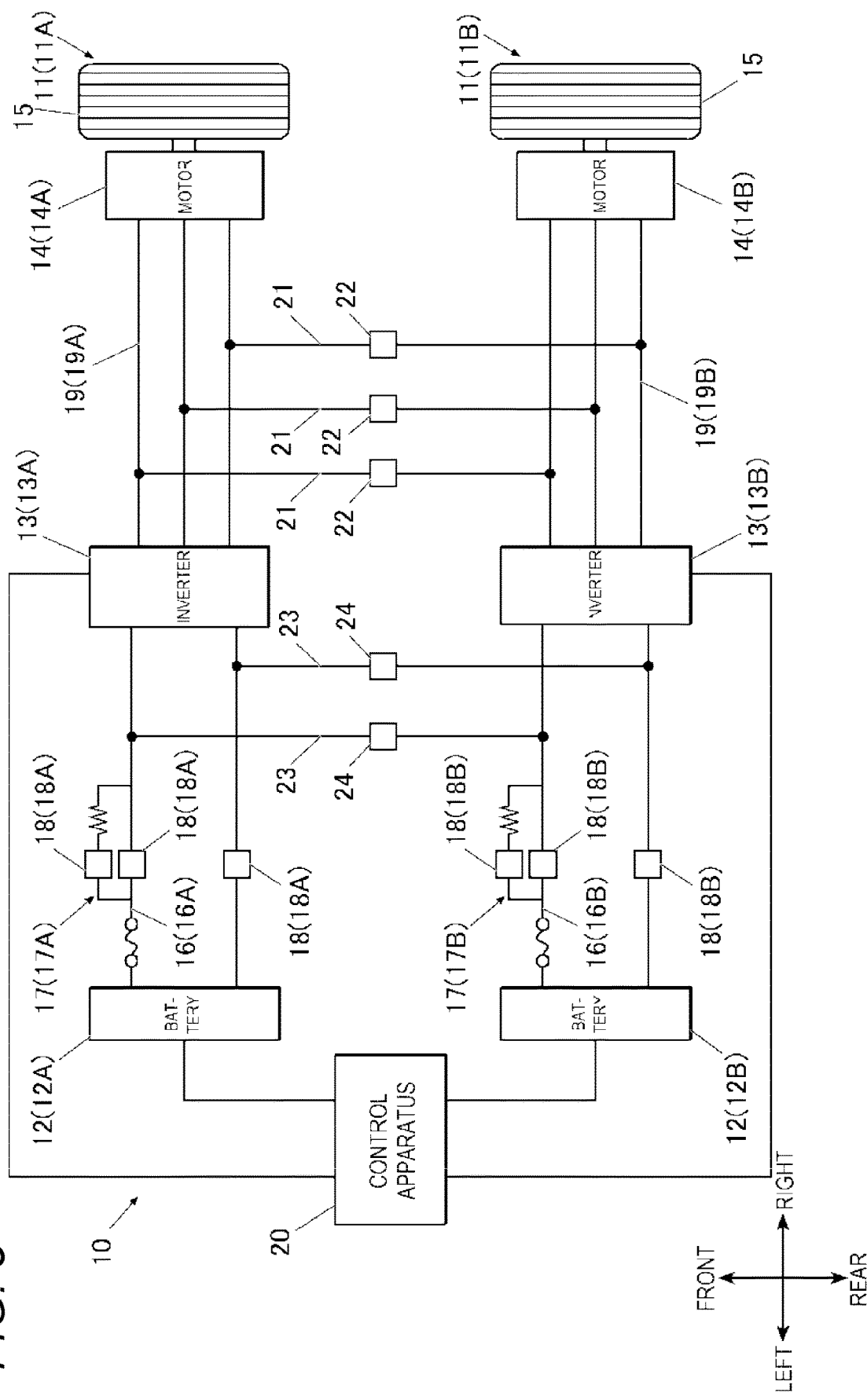
FIG. 5 illustrates the configuration of an electric vehicle according to a second embodiment.

FIG. 5 illustrates the configuration of an electric vehicle according to the second embodiment of the disclosure. In the second embodiment, the configuration of a left portion of the electric vehicle 10 is the same as that of a right portion of the electric vehicle 10, and a description thereof will be omitted.

In the second embodiment, as in the first embodiment, the wires 19 of the plurality of drive systems 11 are coupled to each other by the first bypass lines 21 including the electromagnetic switches 22. Moreover, the power lines 16 of the plurality of drive systems 11 are coupled to each other by second bypass lines 23.

In the second embodiment, electromagnetic switches 24 are attached to the second bypass lines 23, respectively.

When an abnormality occurs in supply of the DC power from the battery 12 (an example of the power supply) to the inverter 13 in one drive system 11, the control apparatus 20 performs control (i) to stop the supply of the DC power from the battery 12, and (ii) to supply the DC power, which is supplied from the battery 12 to the inverter 13 in the other drive system 11, to the inverter 13 in the one drive system 11 via the second bypass lines 23.

Figure 6:
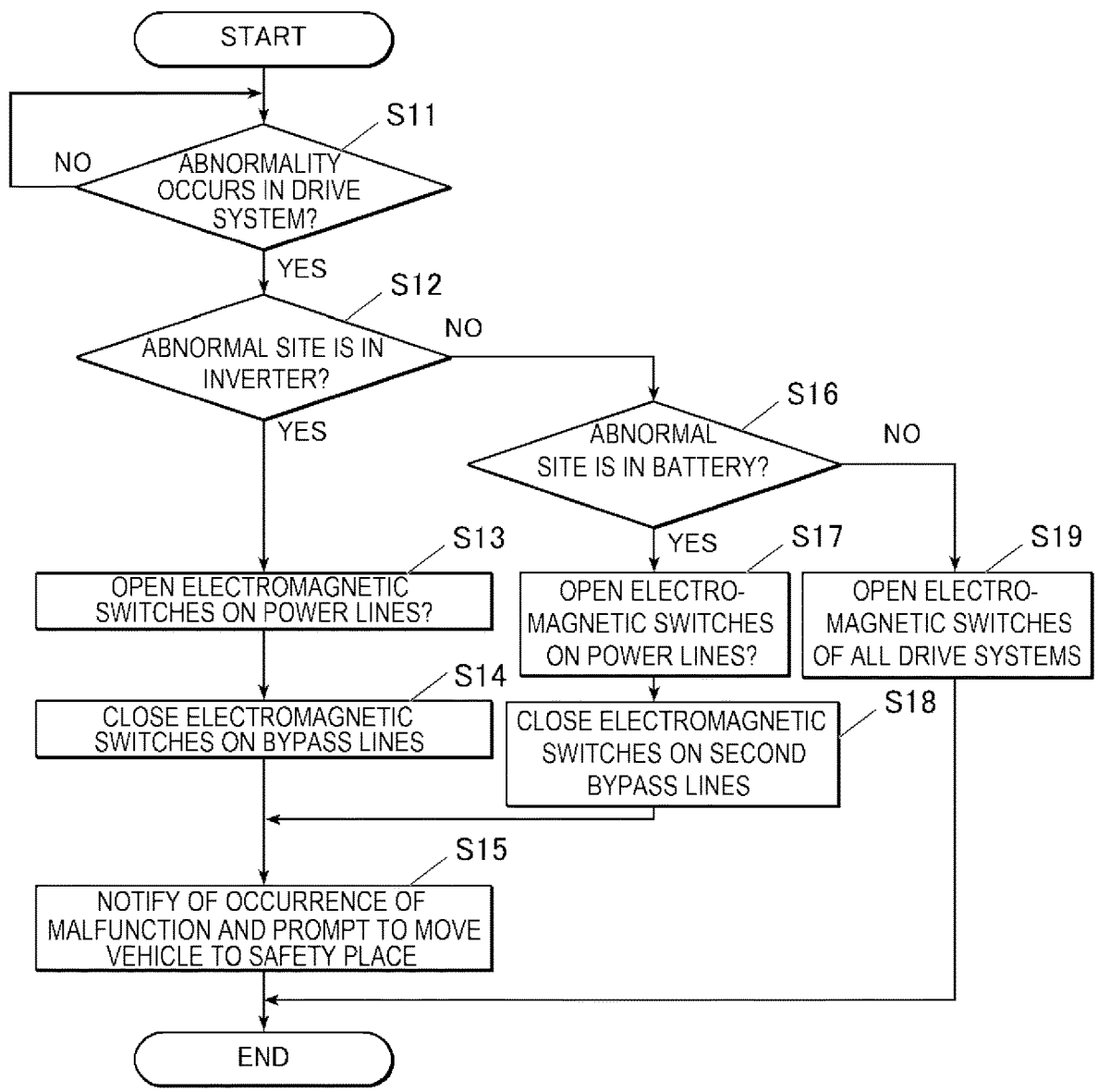
FIG. 6 is a flowchart illustrating a control method by a control apparatus according to the second embodiment.

This will be described in detail below. A control method by the control apparatus 20 will also be described based on a flowchart illustrated in FIG. 6.

The control apparatus 20, as with the first embodiment, always monitors whether an abnormality has occurred in each drive system 11 (step S11).

For example, when the control apparatus 20 determines that the abnormality has occurred in the drive system 11A on a front right side (step S11: YES), then the control apparatus 20 determines whether a site where the abnormality has occurred is in the inverter 13A (step S12).

When the abnormal site is in the inverter 13A (step S12: YES), the control apparatus 20 performs a same processing as that of the first embodiment.

That is, the control apparatus 20 opens electromagnetic switches 18A of power lines 16A that are coupled to the inverter 13A and the electromagnetic switch 18A of a pre-charge circuit 17A (step S13) to stop the supply of the DC power from the battery 12A to the inverter 13A.

The control apparatus 20 performs control to render the first bypass lines 21 conductive by closing the electromagnetic switches 22 of the first bypass lines 21 that respectively coupled the wires 19A of the drive system 11A on the front right side and the wires 19B of the drive system 11B on the rear right side (step S14). As a result, the AC power, which is supplied from the inverter 13B to the motor 14B in the drive system 11B on the rear right side, is also supplied to the motor 14A of the drive system 11A on the front right side via the first bypass lines 21 as illustrated in FIG. 4.

In this way, in the second embodiment, when the abnormality occurs in the inverter 13A which leads to the abnormality in the supply of the AC power from the inverter 13A to the motor 14A, the AC power is supplied from the inverter 13B that supplies the normal AC power, (i) to the original supply target 14B and (ii) via the first bypass lines 21 to the motor 14A of the other drive system 11A. Therefore, it is possible to properly prevent the electric vehicle 10 from being disabled. A driver can pull the vehicle over to a side of a road to stop the vehicle or drive (transport) the vehicle to a repair plant.

Also in this case, although not illustrated, the control apparatus 20 notifies a driver of an occurrence of a malfunction and prompts the driver to move the vehicle to a safe place (step S15).

On the other hand, when the control apparatus 20 determines that the inverter 13A is normal (step S12: NO), then the control apparatus 20 determines whether a site where the abnormality has occurred is in the battery 12A (step S16).

When the abnormal site is in the battery 12A (step S16: YES), the control apparatus 20 opens the electromagnetic switches 18A of the power lines 16A that coupled the battery 12A to the inverter 13A and the electromagnetic switch 18A of the pre-charge circuit 17A (step S17) to stop the supply of the DC power from the battery 12A to the inverter 13A.

Figure 7:
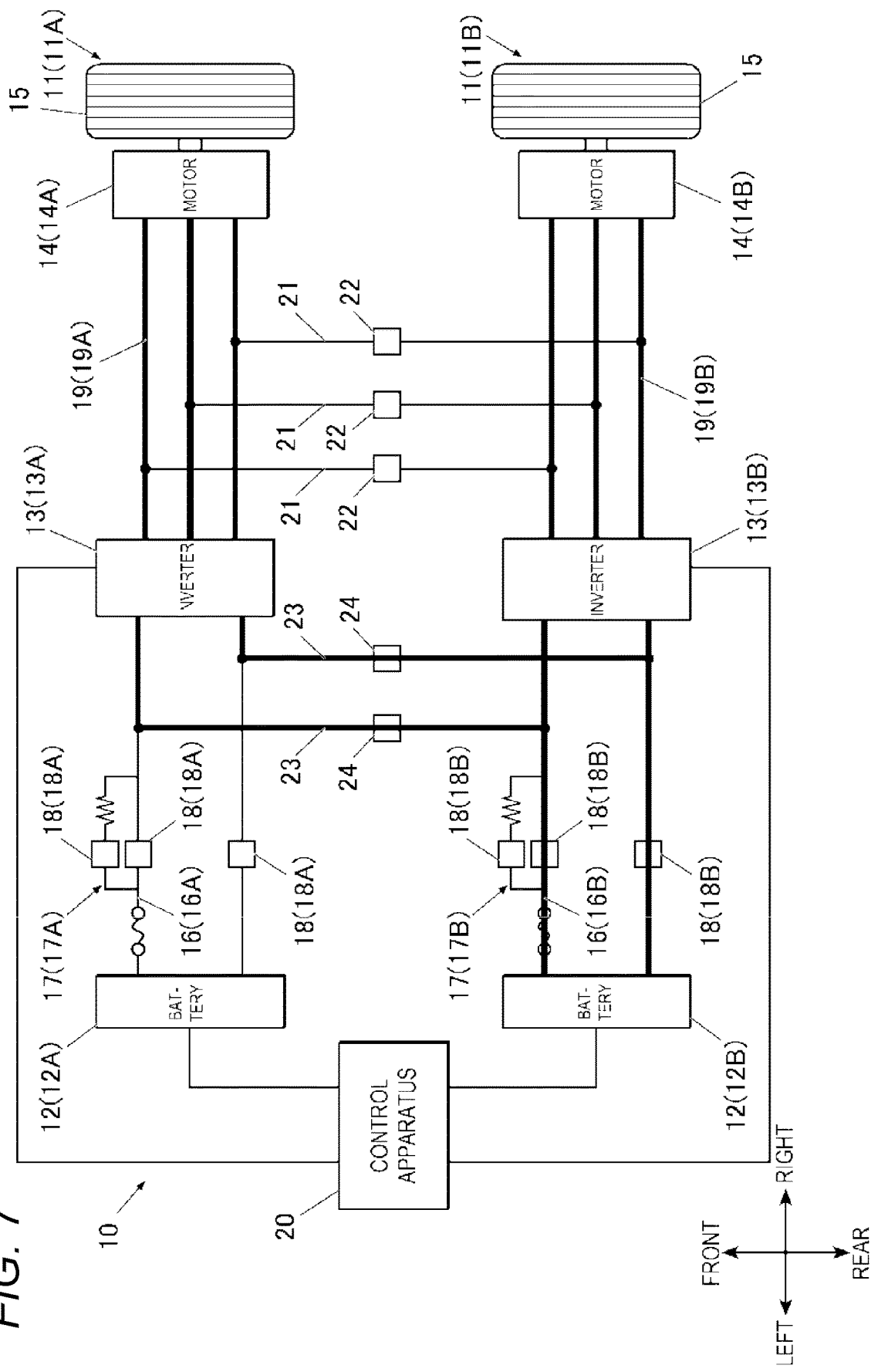
FIG. 7 illustrates a flow of DC power and AC current according to the second embodiment.

Then, the control apparatus 20 performs control to render the second bypass lines 23 conductive by closing the electromagnetic switches 24 of the second bypass lines 23 that respectively couple the power lines 16A of the drive system 11A on the front right side and power lines 16B of the drive system 11B on the rear right side (step S18). As a result, the DC power, which is supplied from a battery 12B to the inverter 13B in the drive system 11B on the rear right side, is also supplied to the inverter 13A of the drive system 11A on the front right side via the second bypass lines 23 as illustrated in FIG. 7. In FIG. 7, a flow of DC power and AC current in the second embodiment is indicated by thick lines.

Although not illustrated, it is assumed arguendo that the respective second bypass lines 23 are coupled to the power lines 16 upstream of the electromagnetic switches 18 which are disposed on the power lines 16 and the pre-charge circuits 17 in the drive systems 11A and 11B, that is, at portions between the batteries 12 and the electromagnetic switches 18. In this case, if the power lines 16A of the drive system 11A and the power lines 16B of the drive system 11B are rendered conductive by closing the respective electromagnetic switches 24 of the second bypass lines 23 (step S18), the DC power, which is supplied from the battery 12B to the inverter 13B in the drive system 11B on the rear right side, is not supplied to the inverter 13A in the drive system 11A on the front right side via the second bypass lines 23 even when the respective electromagnetic switches 18A of the power lines 16A and the like of the drive system 11A are opened (step S17).

Therefore, in the second embodiment, as illustrated in FIG. 5 and the like, the second bypass lines 23 are coupled to the power lines 16A downstream of the electromagnetic switches 18A disposed on the power lines 16A and the like of the drive system 11A, that is, at portions between the electromagnetic switches 18A and the inverter 13A, and the second bypass lines 23 are coupled to the power lines 16B downstream of electromagnetic switches 18B disposed on the power lines 16B and the like of the drive system 11B, that is, at portions between the electromagnetic switches 18B and the inverter 13B.

As described above, in the second embodiment, when the abnormality occurs in the supply of the AC power from the inverter 13A to the motor 14A because the abnormality occurs in the battery 12A, but the inverter 13A is normal, the DC power is supplied from the battery 12B, which supplies the normal DC power, of the other drive system 11B (i) to the original supply target inverter 13B and (ii) via the second bypass lines 23 to the inverter 13A of the drive system 11A (see FIG. 7).

Since the AC power is appropriately supplied from the inverter 13A to the motor 14A, it is possible to properly prevent the electric vehicle 10 from being disabled.

In the second embodiment, travel of the electric vehicle 10 can be continued as described above. However, even in the second embodiment, the abnormality still occurs in the battery 12A.

For this reason, although not illustrated, the control apparatus 20 notifies the driver of the occurrence of the malfunction and prompts the driver to move the vehicle to the safe place (step S15).

When the abnormality occurs in the drive system 11 while no abnormality occurs in the inverter 13A and the battery 12A (step S12: NO, and step S16: NO), the abnormality might occur in the motor 14A itself. When the travel of the vehicle is continued, an occupant might be put in danger.

Therefore, when no abnormality occurs in the inverter 13 and the battery 12 of the drive system 11 in interest (step S12: No, and step S16: NO), the control apparatus 20 opens the respective electromagnetic switches 18 disposed on the power lines 16, the pre-charge circuits 17, and the like of all the drive systems 11 of the electric vehicle 10 (step S19) to stop the vehicle.

Modification of Second Embodiment

Modification 1

An abnormality may occur in the drive system 11 due to a malfunction of the electromagnetic switch 18 disposed on the power line 16, the pre-charge circuit 17, or the like or disconnection of the power line 16 or the like.

Although a flowchart is omitted, in addition to the above embodiment, when a site where the abnormality occurs is in the power line 16 (when an abnormality occurs in the drive system 11 due to the abnormality of the power line 16, for example, due to the malfunction of the electromagnetic switch 18 disposed on the power line 16 or the like or due to disconnection of the power line 16 or the like), the control apparatus 20 may open the electromagnetic switches 18A disposed on the power lines 16A or the like of the drive system 11A where the abnormality occurs and close the electromagnetic switches 24 of the second bypass lines 23 as in the above embodiment, to supply the DC power from the battery 12B of the other drive system 11B to the inverter 13A of the drive system 11A.

Modification 2

In a very rare case, in the two drive systems 11A and 11B having the power lines 16 which are coupled to each other by the second bypass lines 23 (see FIG. 5), for example, an abnormality may occur in the battery 12A of one drive system 11A, and an abnormality may also occur in the inverter 13B of the other drive system 11B.

In this case, when the electromagnetic switches 22 of the bypass wires 21 and the electromagnetic switches 24 of the second bypass wires 23 are kept open (that is, when the two drive systems 11A and 11B are not electrically coupled to each other), the two drive systems 11A and 11B stop operating. Therefore, in this case, none of the front-right wheel 15 and rear-right wheel 15 of the vehicle rotates.

When double abnormalities (malfunctions) occur in this manner, in order to be safe, the vehicle may be stopped by opening the respective electromagnetic switches 18 disposed on the power lines 16 and the like of all the drive systems 11 in the electric vehicle 10.

However, even in this case, the configuration of the present embodiment may be used to rotate both the front-right and rear-right wheels 15, to thereby prevent the electric vehicle 10 from being disabled. This will be described in detail below.

In the above described case, that is, when the abnormality occurs in the battery 12A of the drive system 11A and the abnormality occurs in the inverter 13B of the drive system 11B, the control apparatus 20 performs control (i) to open the respective electromagnetic switches 18A disposed on the power lines 16A and the like that couple the battery 12A to the inverter 13A in the drive system 11A and (ii) to close all the electromagnetic switches 22 of the first bypass lines 21, which couple the drive systems 11A and 11B, and all the electromagnetic switches 24 of the second bypass lines 23, which couple the drive systems 11A and 11B.

Figure 8:
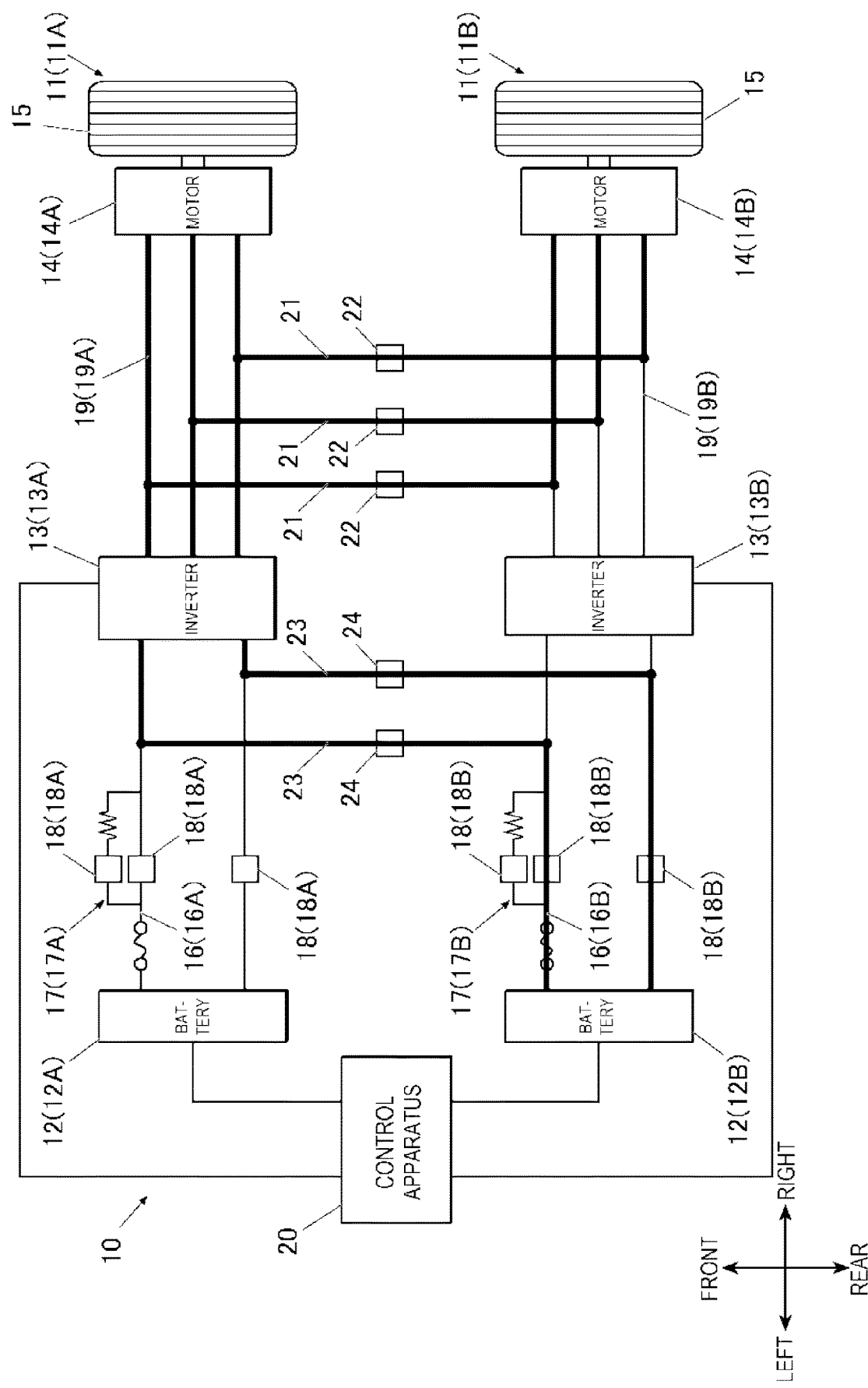
FIG. 8 illustrates a flow of DC power and AC current according to a modification 2 of the second embodiment.

As illustrated in FIG. 8, the DC power is supplied from the normal battery 12B to the normal inverter 13A via the second bypass lines 23. The AC power is supplied from the normal inverter 13A to the motor 14A, and is also supplied to the motor 14B of the other drive system 11B via the first bypass lines 21.

When the control is performed as described above, the abnormal battery 12A and inverter 13B are bypassed, and power is supplied to the motors 14 by coupling the battery 12B and the inverter 13A, which operate normally, to each other.

Therefore, even when the double abnormalities occur as described above, the electric vehicle 10 is prevented from being disabled by rotating both the front-right and rear-right wheels 15 of the vehicle.

Modification 3

As can be seen from FIG. 7, when the inverter 13A of the drive system 11A and the inverter 13B of the drive system 11B operate normally, it is possible to deal with an abnormality occurring in the battery 12 (the battery 12A in FIG. 7) of one of the drive systems 11A and 11B, if the second bypass lines 23 (and the electromagnetic switches 24) are provided, even without the first bypass lines 21 (or the electromagnetic switches 22).

Figure 9:
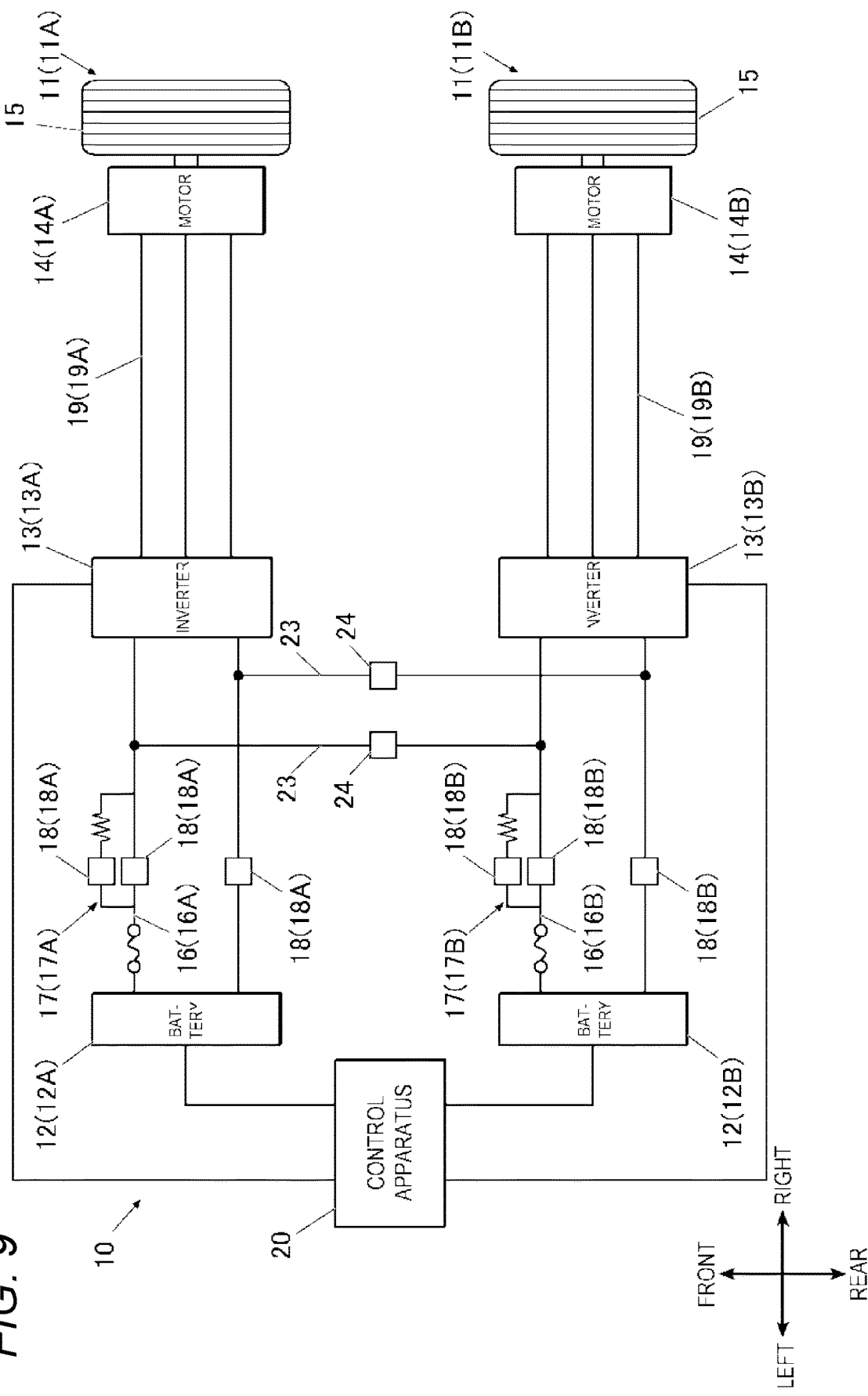
FIG. 9 illustrates the configuration of an electric vehicle according to a modification 3 of the second embodiment.

Therefore, as illustrated in FIG. 9, the electric vehicle 10 has the following configuration. That is, the electric vehicle 10 includes the drive systems 11 each having the battery 12 (an example of the power supply), the inverter 13, and the motor 14. In each drive system 11, the battery 12 and the inverter 13 are coupled to each other by the power lines 16, and the inverter 13 and the motor 14 are coupled to each other by the wires 19. The power lines 16A of the drive system 11A and the power lines 16B of the drive system 11B are coupled to each other by the second bypass lines 23.

In this case, the first bypass lines 21 are not provided.

For example, when an abnormality occurs in the supply of the DC power from the battery 12A to the inverter 13A in the drive system 11A, the control apparatus 20 configured to control the drive system 11A and the drive system 11B may perform control (i) to stop the supply of the DC power from the battery 12A and (ii) to supply the DC power, which is supplied from the battery 12B to the inverter 13B in the other drive system 11B, to the inverter 13A in the drive system 11A via the second bypass lines 23.

With this configuration, even when the abnormality occurs in the battery 12 in one of the drive systems 11, the electric vehicle 10 is reliably prevented from being disabled, and a driver can pull the vehicle over to a side of a road and stop the vehicle, or drive (transport) the vehicle to a repair plant.

It goes without saying that the disclosure is not limited to the above embodiments, but may be modified appropriately without departing from the gist of the disclosure.

The control apparatus 20 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control apparatus 20. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of control apparatus 20.

According to the disclosure, even when an abnormality occurs in supply of AC power from an inverter to a motor in an electric vehicle, the vehicle is prevented from being disabled.

The invention claimed is:

1. An electric vehicle comprising:
a plurality of drive systems;
a control apparatus configured to control the drive systems; and
wheels, wherein
each drive system comprises
a motor, and
an inverter, the motor and the inverter being coupled to each other by wires,
the wires of the plurality of drive systems are coupled to each other by first bypass lines,
each inverter is configured to convert direct current power supplied from a corresponding power supply into alternating current power and supply the alternating current power to the corresponding motor,
each motor is configured to drive the corresponding wheel, and
when an abnormality occurs in the supply of the alternating current power from the inverter to the motor in one of the drive systems, the control apparatus performs control
to stop the supply of the alternating current power from the inverter of the one of the drive systems, and
to supply the alternating current power, which is supplied from the inverter to the motor in another one of the drive systems, to the motor of the one of the drive systems via the first bypass lines,
wherein:
the wheels comprise a front-right wheel, a rear-right wheel, a front-left wheel, and a rear-left wheel,
the drive systems are provided for the front-right wheel, the rear-right wheel, the front-left wheel, and the rear-left wheel, respectively, and
the first bypass lines (i) couple the wires of the drive system for the front-right wheel and the wires of the drive system for the rear-right wheel to each other and (ii) couple the wires of the drive system for the front-left wheel and the wires of the drive system for the rear-left wheel to each other.

2. The electric vehicle according to claim 1, wherein electromagnetic switches are attached to the first bypass lines, respectively, and
the control apparatus performs the control to supply the alternating current power, which is supplied from the inverter to the motor in the other one of the drive systems, to the motor of the one of the drive systems via the first bypass lines by controlling the electromagnetic switches.

3. The electric vehicle according to claim 2, wherein the wheels comprise a front-right wheel, a rear-right wheel, a front-left wheel, and a rear-left wheel,
the drive systems are provided for the front-right wheel, the rear-right wheel, the front-left wheel, and the rear-left wheel, respectively, and
the first bypass lines (i) couple the wires of the drive system for the front-right wheel and the wires of the drive system for the rear-right wheel to each other and (ii) couple the wires of the drive system for the front-left wheel and the wires of the drive system for the rear-left wheel to each other.

4. The electric vehicle according to claim 3, wherein each drive system comprises a power supply,
the power supply and the inverter are coupled to each other by a power line in each drive system,
the power lines of the plurality of drive systems are coupled to each other by second bypass lines, and
when an abnormality occurs in supply of the direct current power from the power supply to the inverter in one of the drive systems, the control apparatus performs control
to stop the supply of the direct current power from the power supply of the one of the drive systems, and
to supply the direct current power, which is supplied from the power supply to the inverter in another one of the drive systems, to the inverter of the one of the drive systems via the second bypass lines.

5. The electric vehicle according to claim 2, wherein each drive system comprises a power supply,
the power supply and the inverter are coupled to each other by a power line in each drive system,
the power lines of the plurality of drive systems are coupled to each other by second bypass lines, and when an abnormality occurs in supply of the direct current power from the power supply to the inverter in one of the drive systems, the control apparatus performs control
- to stop the supply of the direct current power from the power supply of the one of the drive systems, and
- to supply the direct current power, which is supplied from the power supply to the inverter in another one of the drive systems, to the inverter of the one of the drive systems via the second bypass lines.

6. The electric vehicle according to claim 1, wherein
each drive system comprises a power supply,
the power supply and the inverter are coupled to each other by a power line in each drive system,
the power lines of the plurality of drive systems are coupled to each other by second bypass lines, and
when an abnormality occurs in supply of the direct current power from the power supply to the inverter in one of the drive systems, the control apparatus performs control
- to stop the supply of the direct current power from the power supply of the one of the drive systems, and
- to supply the direct current power, which is supplied from the power supply to the inverter in another one of the drive systems, to the inverter of the one of the drive systems via the second bypass lines.

7. The electric vehicle according to claim 6, wherein each second bypass line is coupled to the corresponding power lines between (i) electromagnetic switches disposed on the corresponding power lines and (ii) the inverters.

8. The electric vehicle according to claim 1, wherein
each drive system comprises a power supply,
the power supply and the inverter are coupled to each other by a power line in each drive system,
the power lines of the plurality of drive systems are coupled to each other by second bypass lines, and
when an abnormality occurs in supply of the direct current power from the power supply to the inverter in one of the drive systems, the control apparatus performs control
- to stop the supply of the direct current power from the power supply of the one of the drive systems, and
- to supply the direct current power, which is supplied from the power supply to the inverter in another one of the drive systems, to the inverter of the one of the drive systems via the second bypass lines.

9. An electric vehicle comprising:
a plurality of drive systems;
circuitry configured to control the drive systems; and
wheels, wherein
each drive system comprises
- a motor, and
- an inverter, the motor and the inverter being coupled to each other by wires, the wires of the plurality of drive systems are coupled to each other by first bypass lines,
each inverter is configured to convert direct current power supplied from a corresponding power supply into alternating current power and supply the alternating current power to the corresponding motor,
each motor is configured to drive the corresponding wheel, and
when an abnormality occurs in the supply of the alternating current power from the inverter to the motor in one of the drive systems, the circuitry performs control
- to stop the supply of the alternating current power from the inverter of the one of the drive systems, and
- to supply the alternating current power, which is supplied from the inverter to the motor in another one of the drive systems, to the motor of the one of the drive systems via the first bypass lines, wherein:
the wheels comprise a front-right wheel, a rear-right wheel, a front-left wheel, and a rear-left wheel,
the drive systems are provided for the front-right wheel, the rear-right wheel, the front-left wheel, and the rear-left wheel, respectively, and
the first bypass lines (i) couple the wires of the drive system for the front-right wheel and the wires of the drive system for the rear-right wheel to each other and (ii) couple the wires of the drive system for the front-left wheel and the wires of the drive system for the rear-left wheel to each other.

* * * * *